(12) United States Patent
Hu et al.

(10) Patent No.: US 11,678,036 B2
(45) Date of Patent: Jun. 13, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Shu-Shan Chen, Taoyuan (TW);
Chen-Hsien Fan, Taoyuan (TW);
Yueh-Lin Lee, Taoyuan (TW);
Yu-Chiao Lo, Taoyuan (TW);
Sung-Mao Tsai, Taoyuan (TW);
Shang-Hung Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 368 days.

(21) Appl. No.: 16/845,520

(22) Filed: Apr. 10, 2020

(65) Prior Publication Data

US 2020/0393641 A1    Dec. 17, 2020

Related U.S. Application Data

(60) Provisional application No. 62/861,440, filed on Jun. 14, 2019.

(30) Foreign Application Priority Data

Feb. 3, 2020    (CN) .......................... 202020150684.4

(51) Int. Cl.
*H04N 23/51* (2023.01)
*G02B 7/00* (2021.01)
(Continued)

(52) U.S. Cl.
CPC ............. *H04N 23/51* (2023.01); *G02B 7/005* (2013.01); *G02B 7/026* (2013.01); *G02B 7/04* (2013.01);
(Continued)

(58) Field of Classification Search
CPC . G02B 7/005; G02B 7/04; G02B 7/09; G02B 26/02; G02B 27/646; G02B 7/02; G02B 7/18; G03B 5/04; G03B 13/36; G03B 2205/0053; G03B 2205/0069; G03B 3/10; G03B 5/02; G03B 2205/0015; G03B 2205/0061; H02K 11/21; H04N 5/2252;
(Continued)

(56) References Cited

U.S. PATENT DOCUMENTS 5,831,671 A * 11/1998 Chigira .............. H04N 5/23248
348/208.8
2009/0070794 A1* 3/2009 Hashimoto .......... G11B 7/1376
(Continued)

*Primary Examiner* — Gevell V Selby
(74) *Attorney, Agent, or Firm* — Muncy, Geissler, Olds & Lowe, P.C.

(57) ABSTRACT

An optical element driving mechanism is provided, including a fixed portion, a movable portion, a driving assembly, and a stopping assembly. The movable portion is movably connected to the fixed portion, wherein the movable portion is used for connecting to an optical element having a main axis. The driving assembly is disposed on the fixed portion or the movable portion, and the driving assembly is used for driving the movable portion to move relative to the fixed portion. The stopping assembly is connected to the movable portion and the fixed portion.

18 Claims, 17 Drawing Sheets

(51) Int. Cl.
| | |
|---|---|
| G03B 5/04 | (2021.01) |
| G02B 7/04 | (2021.01) |
| G02B 27/64 | (2006.01) |
| H02K 11/21 | (2016.01) |
| G02B 7/09 | (2021.01) |
| G02B 26/02 | (2006.01) |
| G02B 7/02 | (2021.01) |
| G02B 7/08 | (2021.01) |
| G03B 3/10 | (2021.01) |
| G03B 5/02 | (2021.01) |
| H02N 2/04 | (2006.01) |
| G03B 13/36 | (2021.01) |
| H04N 23/55 | (2023.01) |
| H04N 23/57 | (2023.01) |
| H04N 23/60 | (2023.01) |

(52) U.S. Cl.
CPC .............. *G02B 7/08* (2013.01); *G02B 7/09* (2013.01); *G02B 26/02* (2013.01); *G02B 27/646* (2013.01); *G03B 3/10* (2013.01); *G03B 5/02* (2013.01); *G03B 5/04* (2013.01); *G03B 13/36* (2013.01); *H02K 11/21* (2016.01); *H02N 2/043* (2013.01); *H04N 23/55* (2023.01); *H04N 23/57* (2023.01); *H04N 23/60* (2023.01); *G03B 2205/0015* (2013.01); *G03B 2205/0053* (2013.01); *G03B 2205/0061* (2013.01); *G03B 2205/0069* (2013.01)

(58) Field of Classification Search
CPC .... H04N 5/2254; H04N 5/2257; H04N 5/232; H02N 2/025; H02N 2/043; H02N 2/101; H02N 2/123
See application file for complete search history.

(56) References Cited

U.S. PATENT DOCUMENTS

| | | | |
|---|---|---|---|
| 2011/0205647 A1* | 8/2011 | Osaka | F16F 1/021 267/161 |
| 2018/0100983 A1* | 4/2018 | Kao | G03B 5/00 |
| 2020/0241236 A1* | 7/2020 | Liu | G02B 7/04 |
| 2020/0249421 A1* | 8/2020 | Hu | H04N 5/2328 |

* cited by examiner

OPTICAL ELEMENT DRIVING MECHANISM

CROSS REFERENCE TO RELATED APPLICATIONS

This application claims the benefit of U.S. Provisional Application No. 62/861,440, filed on Jun. 14, 2019, and China Patent Applications No. 202020150684.4, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided, including a fixed portion, a movable portion, a driving assembly, and a stopping assembly. The movable portion is movably connected to the fixed portion, wherein the movable portion is used for connecting to an optical element having a main axis. The driving assembly is disposed on the fixed portion or the movable portion, and the driving assembly is used for driving the movable portion to move relative to the fixed portion. The stopping assembly is connected to the movable portion and the fixed portion.

In some embodiments, the fixed portion includes a case including a main body and a stopping portion, the stopping portion extends from the main body to the movable portion, and the stopping portion has a shape that is symmetrical relative to the main axis. In some embodiments, the material of the stopping portion includes soft material, and the stopping portion is separate from the main body. In some embodiments, the material of the stopping portion includes metal, and the stopping portion and the main body are formed as one piece. In some embodiments, the stopping portion has a circular shape. In some embodiments, the material of the movable portion includes metal.

In some embodiments, the movable portion includes an arm portion extending away from the main axis, and a contact element disposed on the arm portion. In some embodiments, the arm portion and the contact element are formed as one piece. In some embodiments, the arm portion and the contact element are formed separately. In some embodiments, the arm portion includes a surface, the normal direction of the surface is parallel to the main axis, and the contact element is in direct contact with the surface.

In some embodiments, the optical element driving mechanism further includes a first circuit board disposed on the fixed portion, wherein the first circuit board does not overlap the optical element when viewed along the main axis. In some embodiments, the optical element driving mechanism further includes a second circuit board disposed on the fixed portion, wherein the first circuit board does not overlap the second circuit board when viewed along the main axis. In some embodiments, the optical element driving mechanism further includes another optical element that does not overlap the first circuit board or the second circuit board in a direction that is parallel to the main axis. In some embodiments, the first circuit board overlaps the movable portion in a direction that is perpendicular to the main axis.

In some embodiments, the driving assembly includes two first magnetic elements disposed on the movable portion, and two second magnetic elements disposed on the fixed portion and corresponding to the first magnetic elements. In some embodiments, the driving assembly and the optical element are disposed on the movable portion, and the driving assembly, the optical element, and the movable portion overlap each other in a direction that is perpendicular to the main axis. In some embodiments, the optical element driving mechanism further includes an optical module, wherein the optical module includes a driving component, the driving assembly and the driving component are disposed on opposite sides of the main axis, and the optical element is disposed in the optical module.

In some embodiments, the optical element driving mechanism further includes a connecting element, wherein the connecting element includes four extending portions and four connecting portions disposed on the extending portions, two of the connecting portions are connected to the movable portion, and the other two connecting portions are connected to the fixed portion. In some embodiments, the connecting portions that are connected to the movable portion are disposed on opposite sides of the main axis, and the connecting portions that are connected to the fixed portion are disposed on opposite sides of the main axis. In some embodiments, the movable portion includes an accommodating portion, and the driving assembly is at least partially disposed in the accommodating portion.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
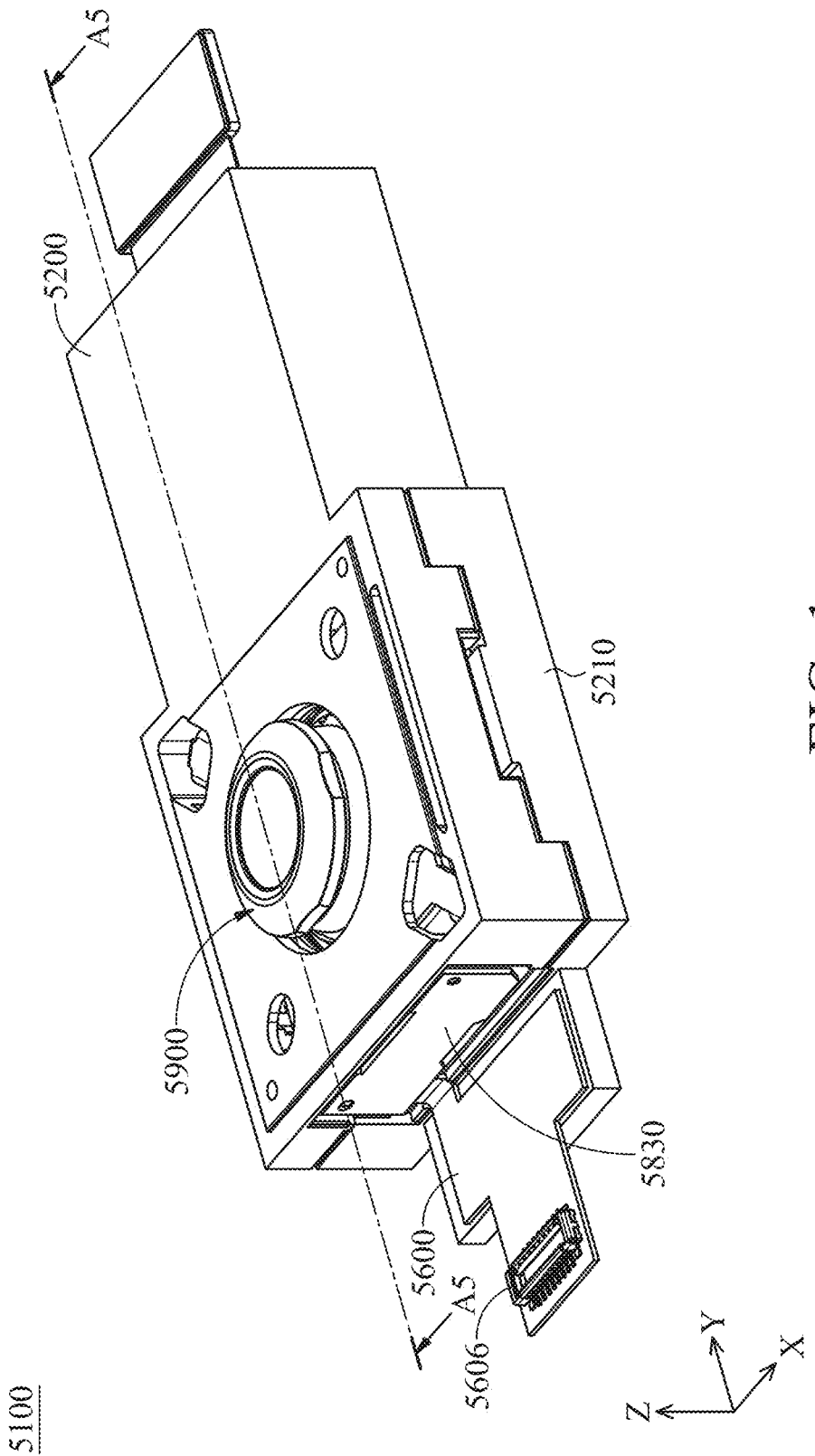
FIG. 1 is a perspective view of an optical element driving mechanism according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
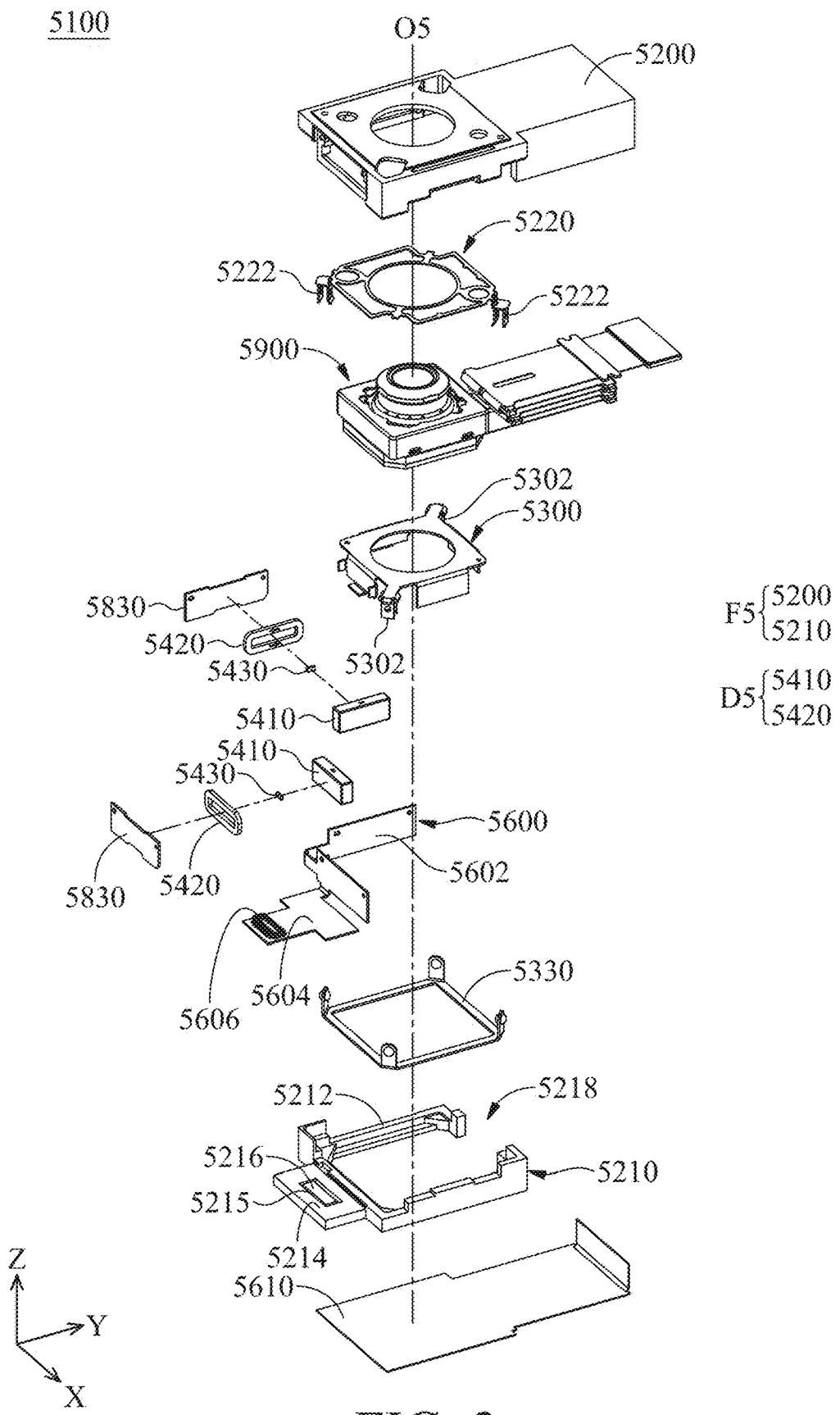
FIG. 2 is an exploded view of the optical element driving mechanism.

In some embodiments of the present disclosure, FIG. 1 to FIG. 4 are a perspective view and an exploded view of an optical element driving mechanism 5100, and a cross-sectional view illustrated along a line A5-A5 in FIG. 1, and a side view of the optical element driving mechanism 5100, respectively. In FIG. 2, the optical element driving mechanism 5100 mainly includes a case 5200, a base 5210, a movable portion 5300, a connecting element 5330, a first magnetic element 5410, a second magnetic element 5420, a position sensor 5430, a first circuit board 5600, a second circuit board 5610, and a magnetic permeable element 5830 arranged in a main axis O5. The optical element driving mechanism 5100 may be used for driving an optical module 5900, or may be used for driving various optical elements, such as a lens, a mirror, a prism, a beam splitter, or an aperture.

Figure 4:
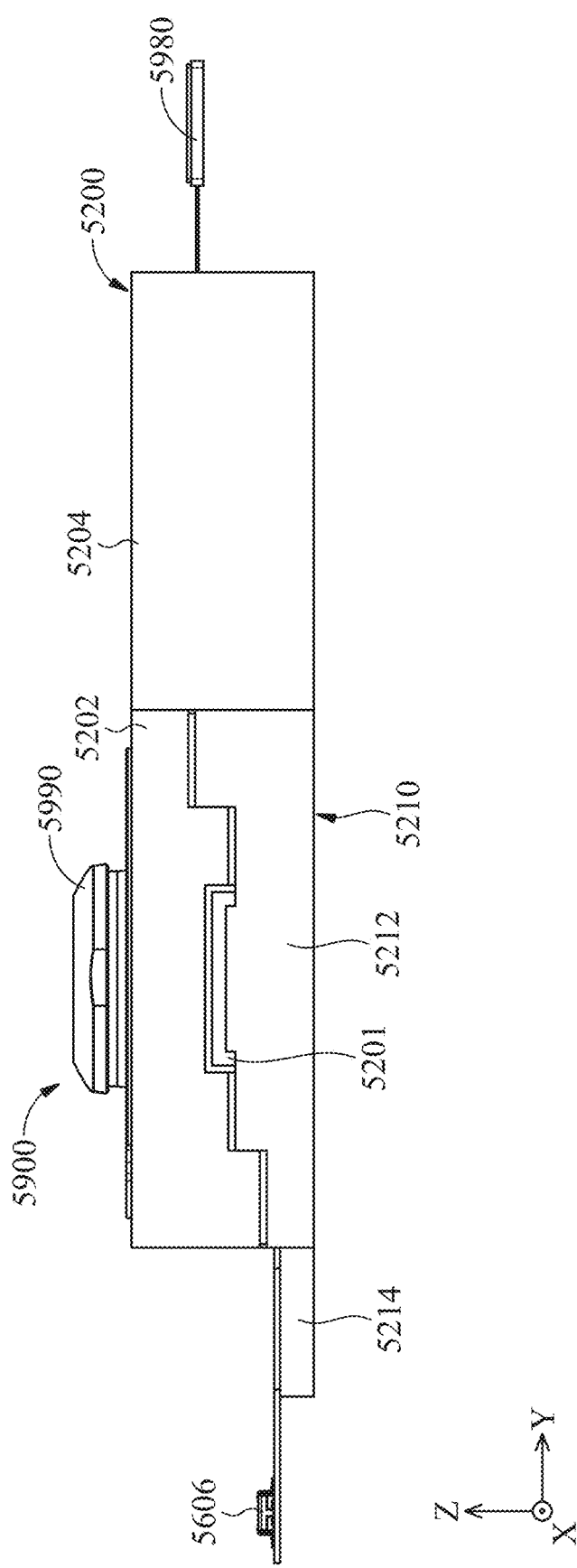
FIG. 4 is a side view of the optical element driving mechanism.

In some embodiments, the case 5200 and the base 5210 may be combined to form the outer case of the optical element driving mechanism 5100. Furthermore, the case 5200 and the base 5210 may be called as a fixed portion F5. In some embodiments, as shown in FIG. 4, a gap 5201 may be formed between the case 5200 and the base 5210. If glue is used for affixing the case 5200 and the base 5210 with each other, the gap 5201 may store excess glue to prevent the glue from contacting with other elements. Furthermore, the case 5200 and the base 5210 may also be affixed with each other by, for example, laser welding.

In some embodiments, the movable portion 5300 is movable relative to the fixed portion F5 (such as including the case 5200 and the base 5210). As a result, the optical module 5900 disposed on the movable portion 5300 may be moved by the movable portion 5300 to achieve auto focus (AF) or optical image stabilization (OIS).

In some embodiments, the first magnetic element 5410 and the second magnetic element 5420 may be referred to as a driving assembly D5 to drive the movable portion 5300 moving relative to the fixed portion F5. For example, the first magnetic element 5410 and the second magnetic element 5420 may include a combination of a driving coil and a driving magnet. For example, the first magnetic element 5410 may be a driving magnet, and the second magnetic element 5420 may be a driving coil. In another example, the first magnetic element 5410 may be a driving coil, and the second magnetic element 5420 may be a driving magnet, and is not limited thereto. It should be noted that the interaction between the first magnetic element 5410 and the second magnetic element 5420 may create a magnetic force to move the optical module 5900 relative to the fixed portion F5, so auto focus (AF) or optical image stabilization (OIS) may be achieved. In some embodiments, the driving assembly D5 may include other driving elements, such as piezoelectric elements, shape memory alloys, etc.

Furthermore, the first circuit board 5600 may be, for example, a flexible printed circuit (FPC) board, which may be affixed on the fixed portion F5 by adhesion. In some embodiments, the first circuit board 5600 is electrically connected to other electronic elements disposed inside or outside the optical element driving mechanism 5100. For example, the first circuit board 5600 may send electric signal to the driving assembly D5 to control the movement of the movable portion 5300.

Figure 3:
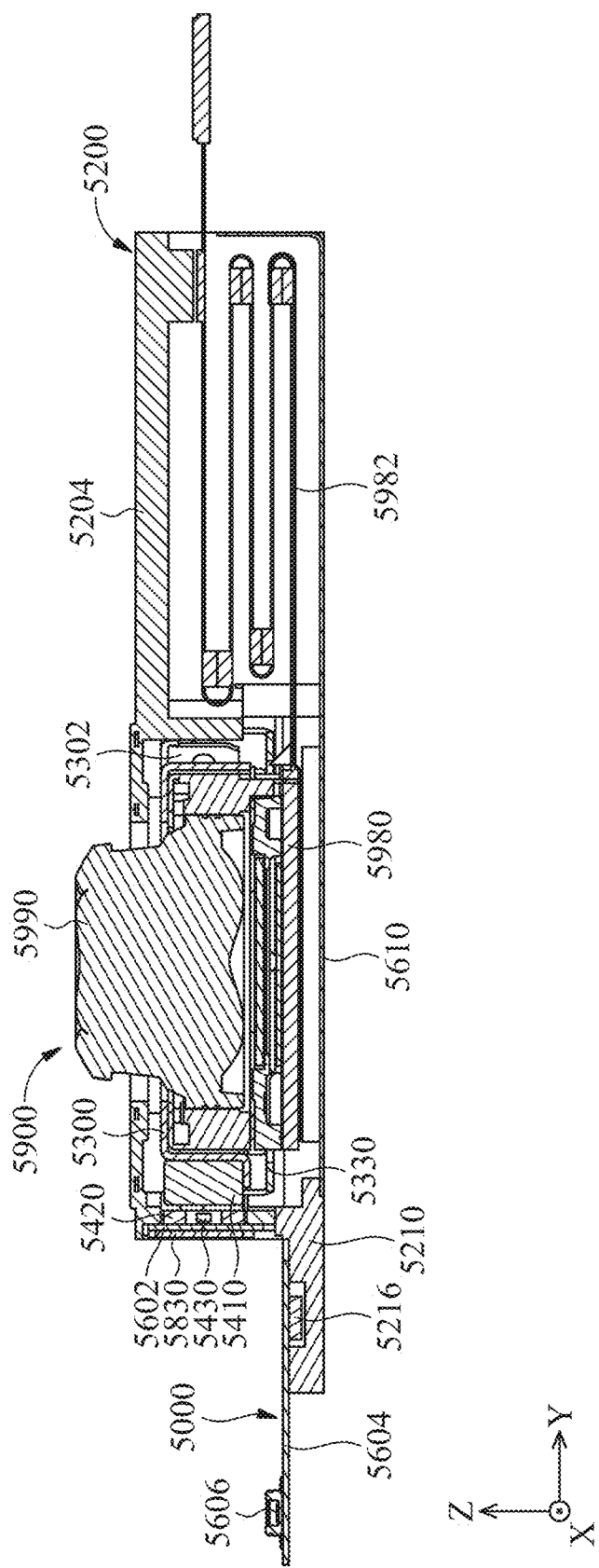
FIG. 3 is a cross-sectional view of the optical element driving mechanism.

As shown in FIG. 2 and FIG. 3, the first circuit board 5600 may include a main body 5602 corresponding to the driving assembly D5, an extending portion 5604 extended outwardly from the main body 5602, and a reading element 5606 disposed on the extending portion 5604. The main body 5602 and the optical module 5900 do not overlap each other along the main axis O5, which reduces the size of the optical element driving mechanism 5100 in the Z axis. Furthermore, in a direction that is perpendicular to the main axis O5, the main body 5602 of the first circuit board 5600 may overlap the movable portion 5300. The reading element 5606 may include control elements such as a chip, and may be electrically connected to, for example, the inertia sensor 5700 (FIG. 18) to process the signal from the inertia sensor 5700.

In some embodiments, position sensor 5430 may be disposed in the optical element driving mechanism 5100 to detect the position of the movable portion 5300 relative to the fixed portion F5. The position sensor 5430 may include Hall effect sensor, magnetoresistance effect sensor (MR Sensor), giant magnetoresistance effect sensor (GMR sensor), tunneling magnetoresistance effect sensor (TMR sensor), or fluxgate sensor. In some embodiments, the position sensor 5430 may be surrounded by the second magnetic element 5420.

Figure 5:
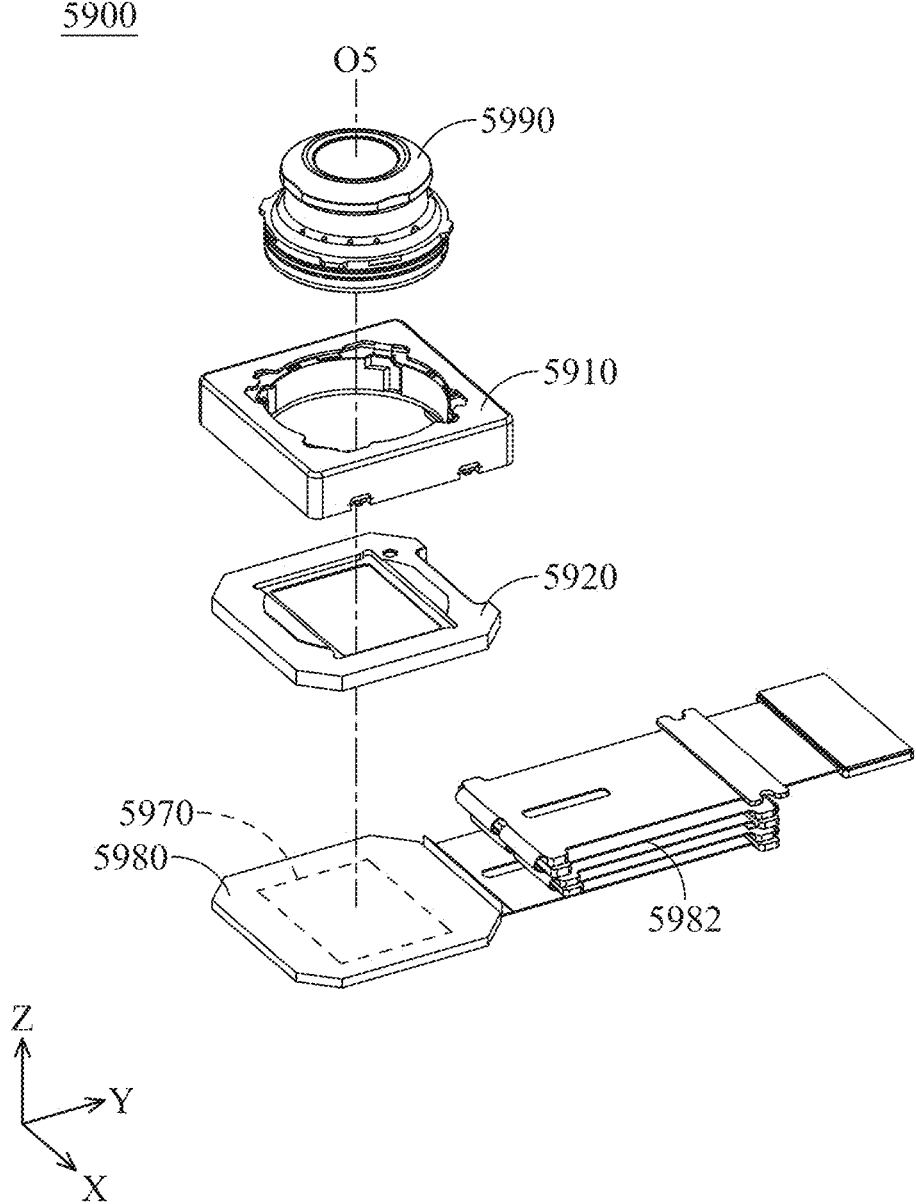
FIG. 5 is an exploded view of the optical module.

FIG. 5 is an exploded view of the optical module 5900. As shown in FIG. 5, the optical module 5900 may include a case 5910, a base 5920, and an optical element 5990 disposed between the case 5910 and the base 5920. These elements are disposed on a substrate 5980 with a photo sensor 5970. It should be noted that a case opening and a bottom opening are formed on the case 5910 and the base 5920, respectively. The center of the case opening corresponds to the main axis O5 of the optical element 5990, and the base opening corresponds to the photo sensor 5970, and the photo sensor 5970 may be disposed on the substrate 5980. As a result, the optical element 5990 disposed in the optical module 5900 may focus with the photo sensor 5970 along the main axis O5 (i.e. Z direction).

Furthermore, a moving assembly (not shown) which is movable relative to the case 5910 and the base 5920 may be disposed in the optical module 5900, and the optical element 5990 may be fixed on the movable assembly, such as by locking, gluing, or engaging. Furthermore, additional driving component may be provided in the optical module 5900, such as an assembly of a magnet and a coil (not shown), to move the optical element 5990 with the movable assembly in a direction that is different than the moving direction of the movable portion 5300. As a result, the optical element 5990 may be moved in more directions. In some embodiments, the driving component of the optical module 5900 and the driving assembly D5 may be disposed on opposite sides of the main axis O5 to reduce magnetic interference.

The substrate 5980 may be, for example, a flexible printed circuit (FPC) board, which may be affixed on the base 5920 by adhesion. In some embodiments, the substrate 5980 is electrically connected to other electronic elements disposed inside or outside the optical module 5900. For example, the substrate 5980 may send electric signal to the driving component to control the movement of the movable assembly in X, Y or Z direction, and thus achieving auto focus (AF) or optical image stabilization (OIS). In some embodiments, please also refer to FIG. 3, the substrate 5980 may include a circuit 5982, and the case 5200 may include a main body 5202 and a side portion 5204, wherein the circuit 5982 may be disposed in the side portion 5204, and other portions of the optical module 5900 may be disposed at the main body 5202 to further protect the circuit 5982. In some embodiments, as shown in FIG. 3, the circuit 5982 may be bent as multiple layers along the main axis O5 to save the space occupied by the circuit 5982, and miniaturization may be achieved. In some embodiments, the circuit 5982 may not overlap other portions of the optical module 5900 along the main axis O5, for example, it does not overlap the movable portion 5300. Furthermore, the circuit 5982 at least partially overlaps the movable portion 5300 in a direction that is perpendicular to the main axis O5 to reduce the size of the optical element driving mechanism 5100 in Z axis to achieve miniaturization.

Furthermore, the optical element driving mechanism 5100 further includes a strengthening element 5220. Although the strengthening element 5220 and the case 5200 are illustrated separately in FIG. 2, the strengthening element 5220 may be disposed in the case 5200, such as embedded in the case 5200, to increase the mechanical strength of the case 5200. In some embodiments, the material of the strengthening element 5220 may include metal to further increase the mechanical strength of the strengthening element 5220. Furthermore, a metal contact element 5222 may be disposed on the strengthening element 5220 for connecting to the connecting element 5330 (described later), such as by soldering, welding, resistance welding, or conductive adhesive. In some embodiments, the strengthening element 5220 and the contact element 5222 may be formed as one piece.

In some embodiments, as shown in FIG. 3, the first circuit board 5600 and the circuit 5982 may be disposed on different sides of the optical element driving mechanism 5100 to decrease the amount of space required in a specific side. For example, they may be disposed on adjacent sides or on opposite sides, so miniaturization may be achieved. Additional optical element may be disposed at a side of the optical element driving mechanism 5100 that no first circuit board 5600 and circuit 5982 is positioned to get an optical system that has multiple optical elements.

Figure 6:
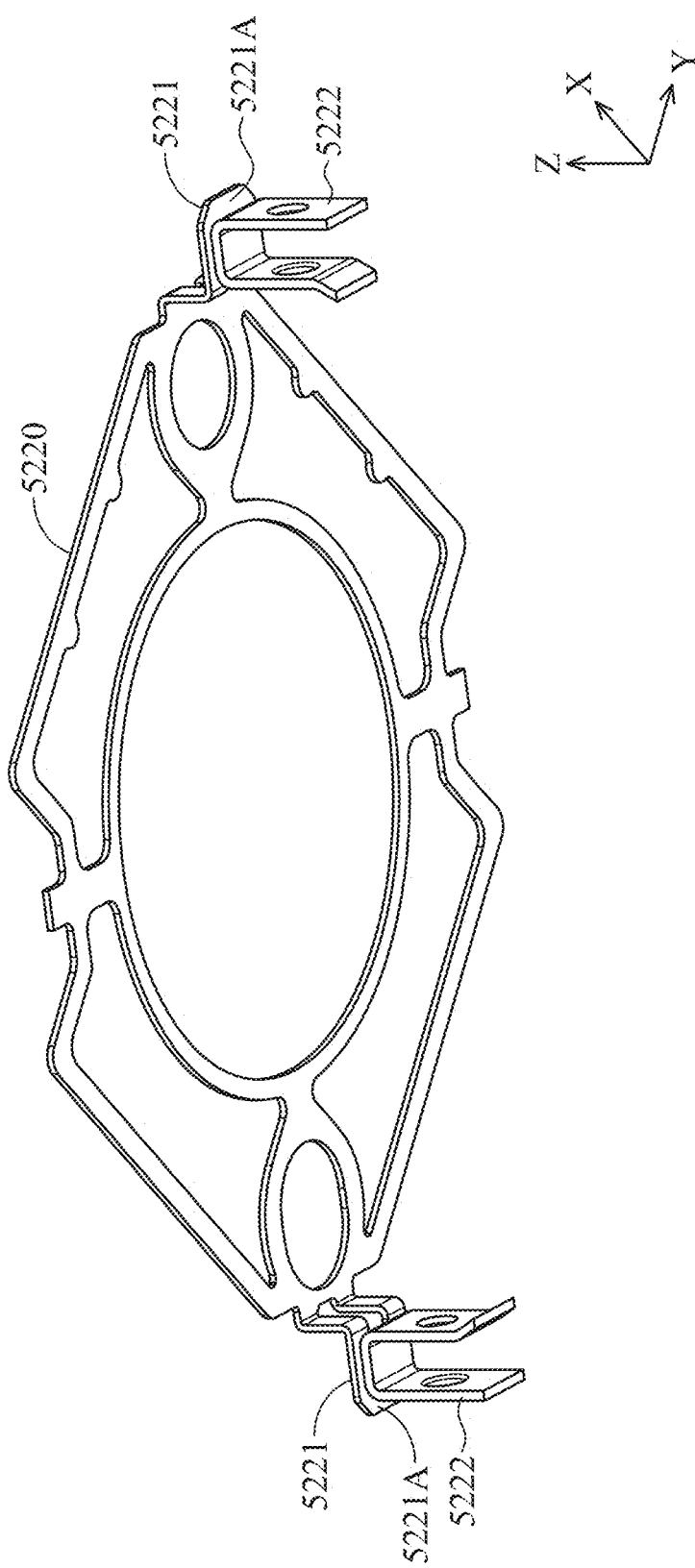
FIG. 6 is a schematic view of the strengthening element.
Figure 7:
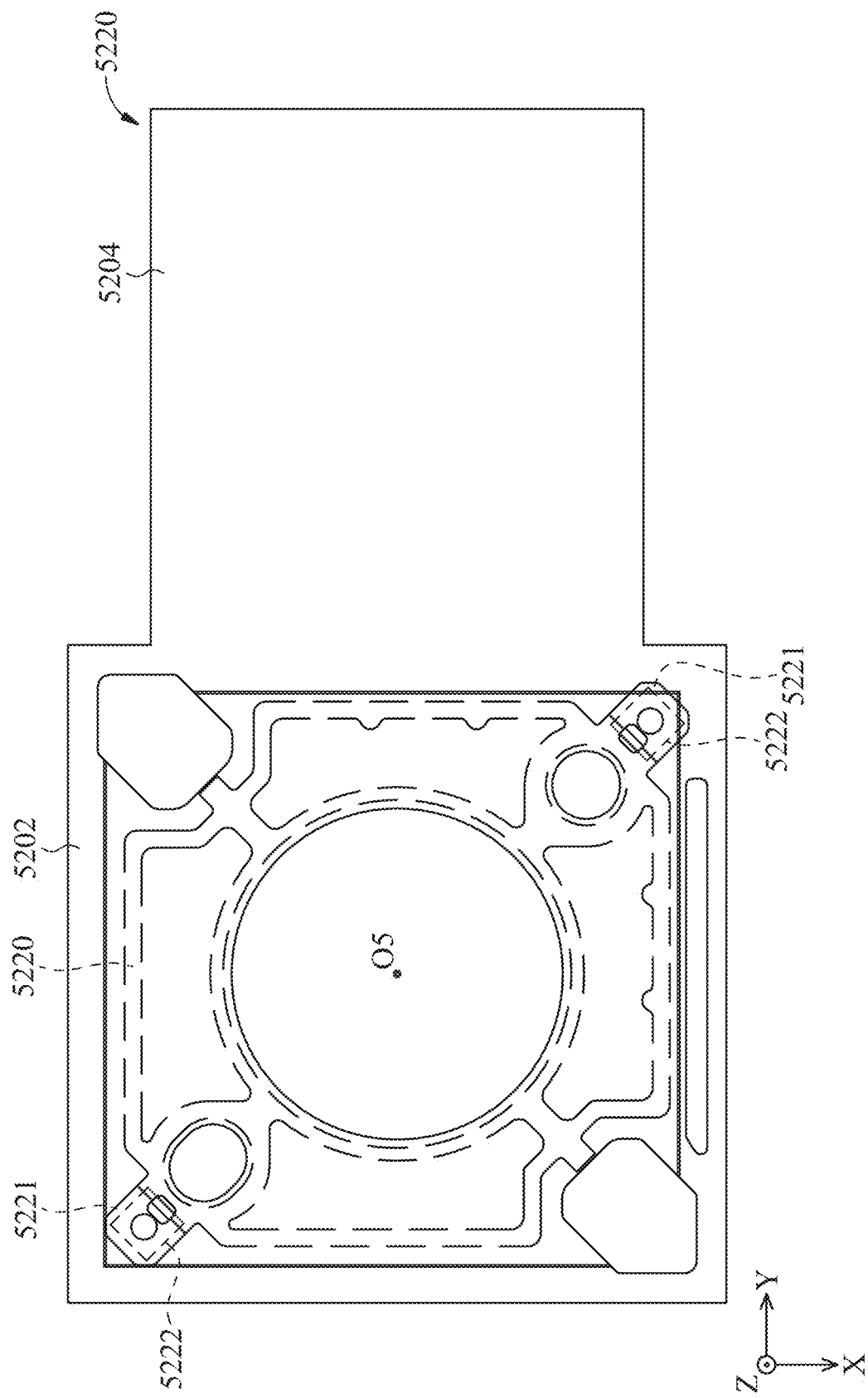
FIG. 7 is a top view of the case and the strengthening element.
Figure 8:
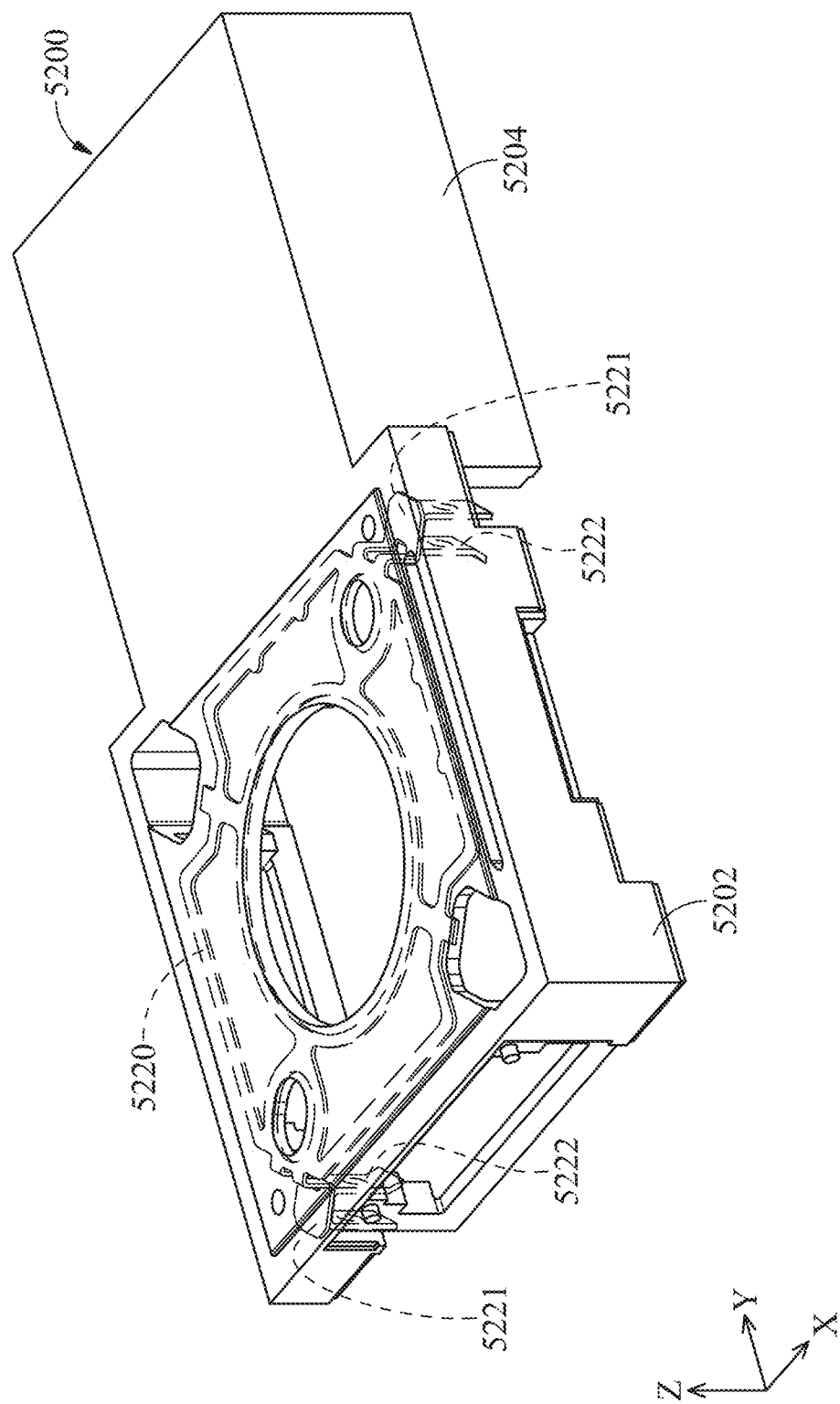
FIG. 8 is a schematic view of the case and the strengthening element.

For example. FIG. 6 is a schematic view of the strengthening element 5220 and the contact element 5222, FIG. 7 is a top view of the case 5200, the strengthening element 5220, and the contact elements 5222, and FIG. 8 is a schematic view of the case 5200, the strengthening element 5220, and the contact elements 5222. The strengthening element 5220 may include two arm portions 5221, the arm portions 5221 may include a surface 5221A facing the −Z direction, and the contact elements 5222 may be disposed on the arm portions 5221 and in contact with the surface 5221A. Furthermore, the two arm portions 5221 and the two contact elements 5222 may be disposed on opposite sides of the main axis O5, such as on a diagonal of the strengthening element 5220, and they may extend to the connecting element 5330 in FIG. 2 (i.e. −Z direction). In some embodiments, the arm portions 5221 are exposed from the case 5220 to allow the contact elements 5222 to be disposed on the arm portions 5221. In some embodiments, the contact elements 5222 may be replaced based on different requirements to achieve modularization.

Figure 9:
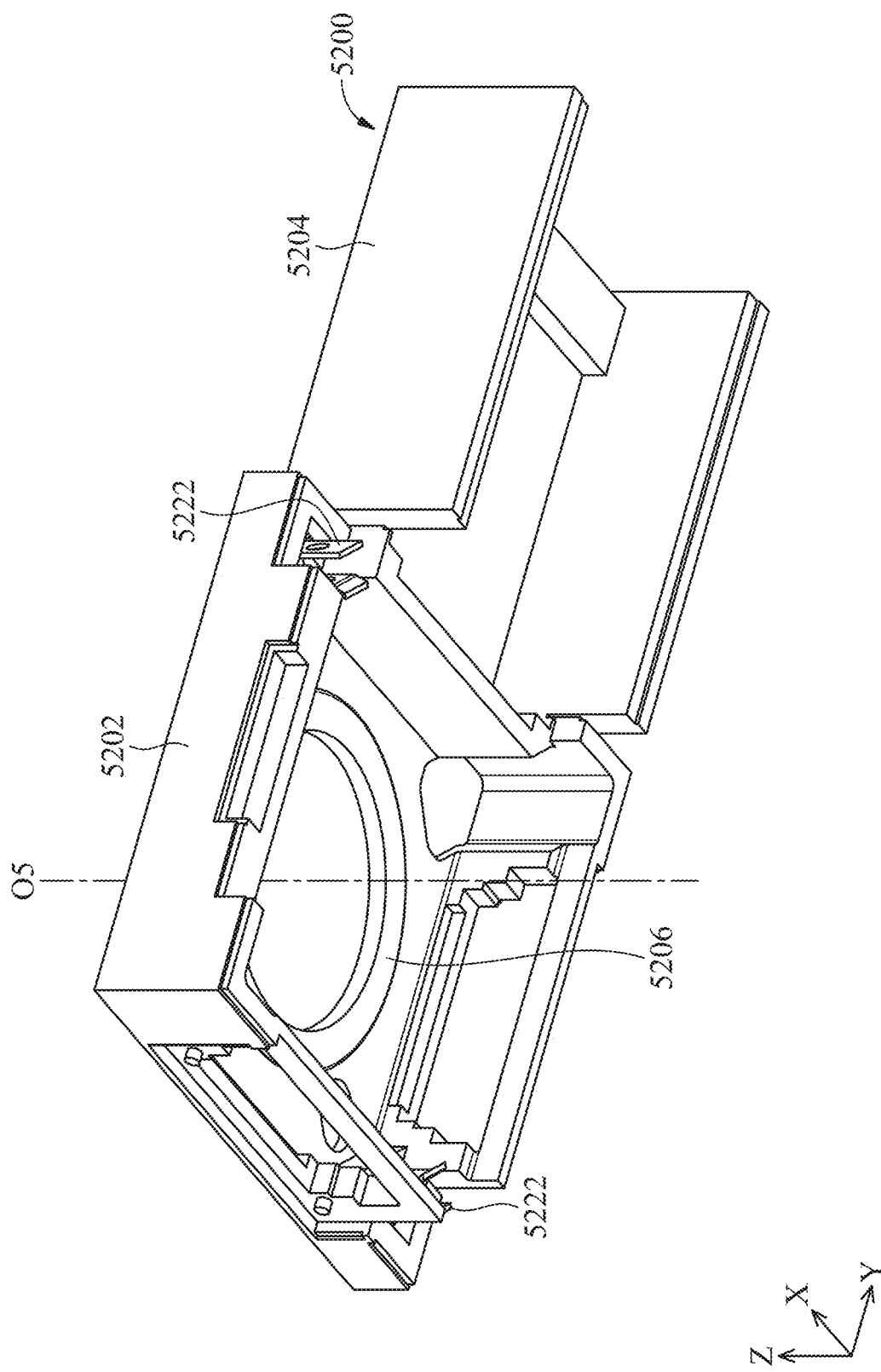
FIG. 9 is a schematic view of the case.

FIG. 9 is a schematic view of the case 5200. The case 5200 includes a stopping portion 5206 at a side that is facing the optical module 5900 (i.e. —Z direction). The stopping portion 5206 extends from the main body 5202 to the movable portion 5300 (FIG. 3). The stopping portion 5206 has a shape that is symmetrical to the main axis O5, such as having a circular shape, and is used for limiting the range of motion of the movable portion 5300 in different directions and preventing the movable portion 5300 from colliding with other portions of the case 5200. The material of the stopping portion 5206 may include soft buffer materials (such as resin or foam) or metal, to prevent other elements from being damaged by the movable portion 5300 when the movable portion 5300 is operating, to reduce noise, or to increase the durability of the stopping portion 5206. The stopping 5206 and the case 5200 may be formed as one piece or may be formed separately, depending on design requirements.

Figure 10:
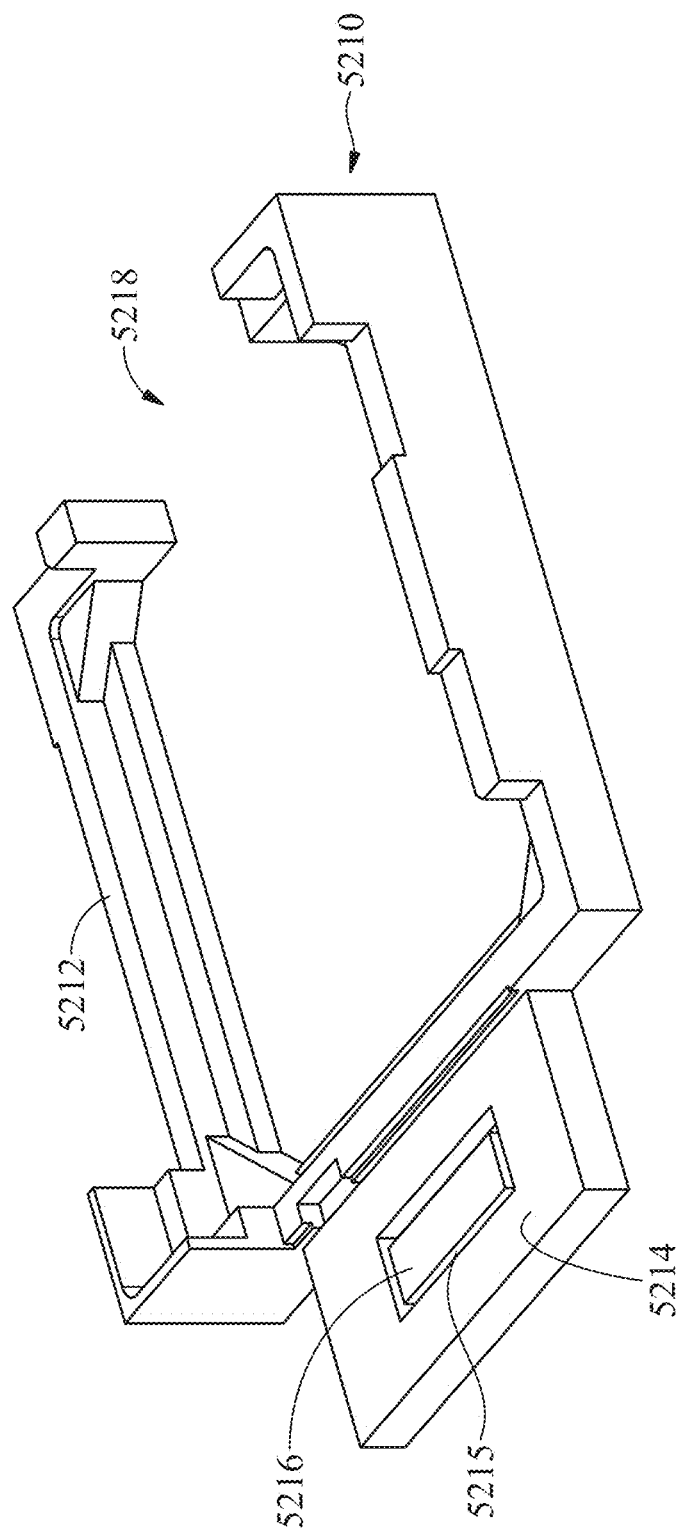
FIG. 10 is a schematic view of the base.

FIG. 10 is a schematic view of the base 5210. The base 5210 includes a main body 5212 and an extending portion 5214 extending from the main body 5212. A recess 5215 is formed on the extending portion 5214, and a control element 5216 may be accommodated and protected in the recess 5215. The control element 5216 may include control elements, such as a chip, to be electrically connected to the driving assembly D5 for driving the driving assembly D5, or may be electrically connected to other elements as well. Furthermore, the base 5210 may include an opening 5218, and the opening 5218 and the extending portion 5214 may be positioned on different sides of the base 5210, so the second circuit board 5610 may pass the opening 5218 for connecting to other elements outside the optical element driving mechanism 5100.

Figure 11:
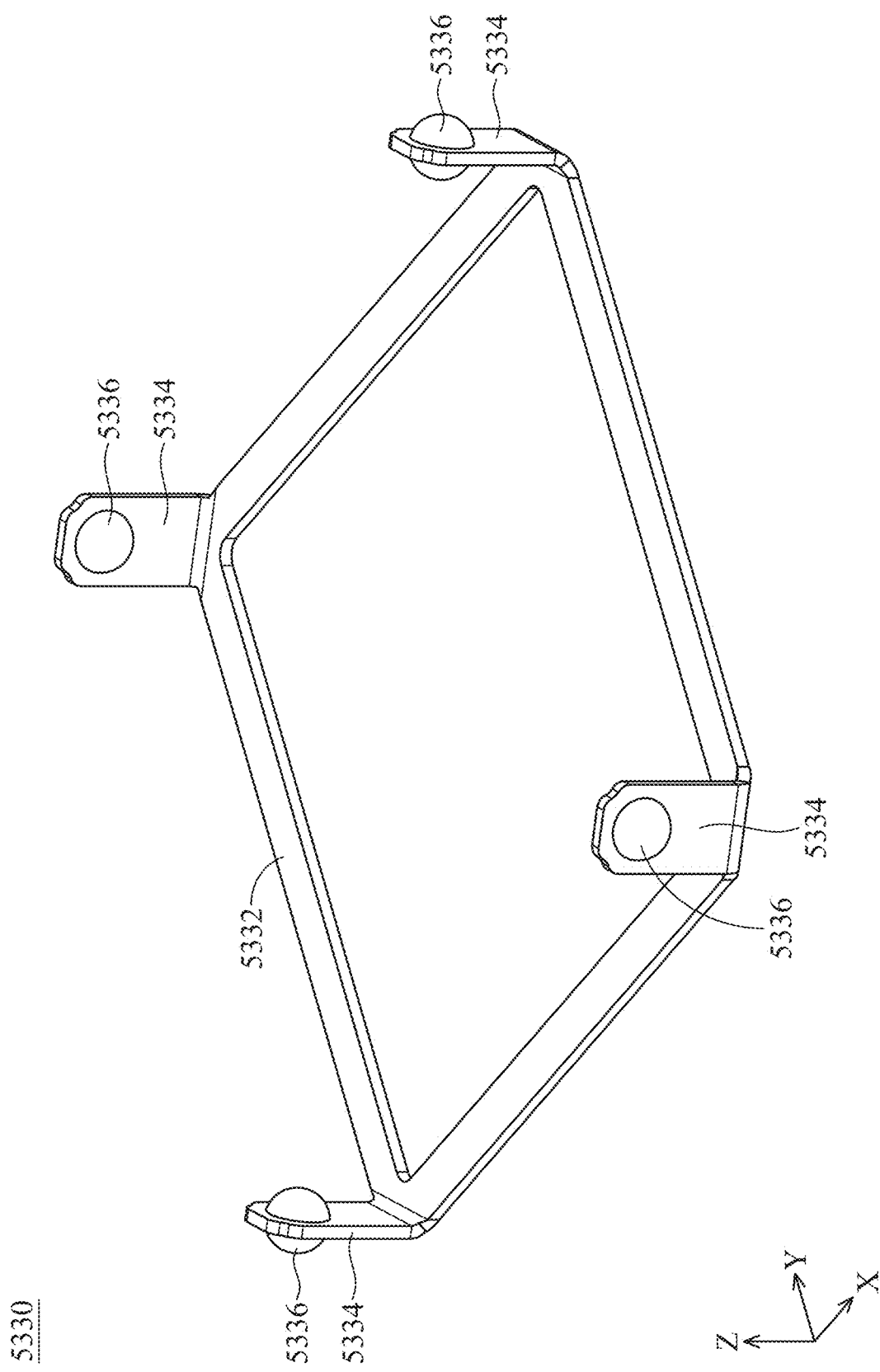
FIG. 11 is a schematic view of the connecting element.

FIG. 11 is a schematic view of the connecting element 5330. The connecting element includes a main body 5332, extending portions 5334, and connecting portions 5336. The extending portions 5334 may extend from the corners of the main body 5332, and the connecting portions 5336 are positioned on the extending portions 5334 and may include spherical shapes. In some embodiments, the material of the connecting element 5330 may be non-magnetic permeable metal to prevent magnetic interference between the connecting element 5330 and other elements in the optical element driving mechanism 5100 (such as the first magnetic element 5410 or the second magnetic element 5420) from occurring.

Figure 12:
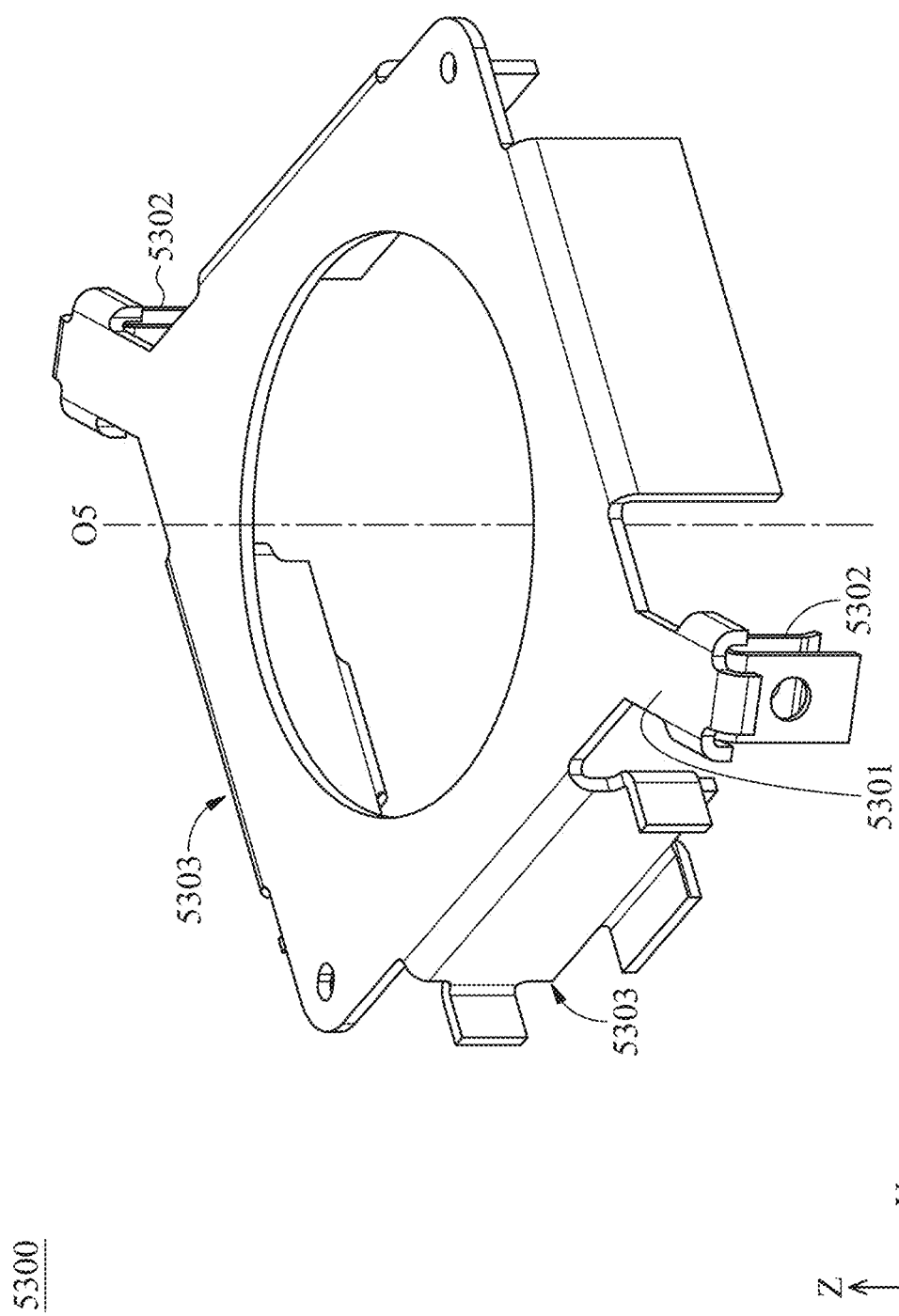
FIG. 12 is a schematic view of the movable portion.
Figure 13:
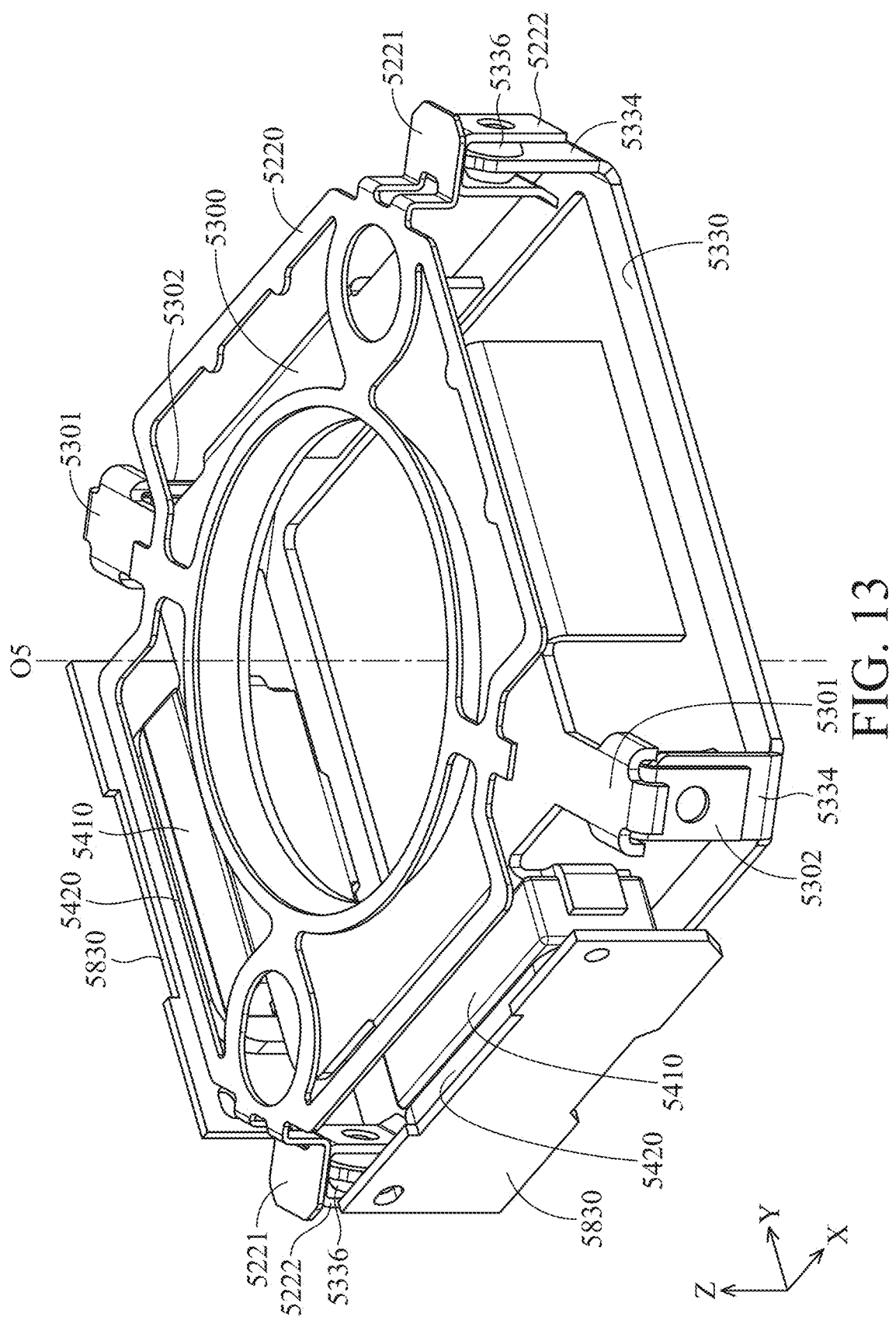
FIG. 13 is a schematic view of some elements of the optical element driving mechanism.

FIG. 12 is a schematic view of the movable portion 5300, and FIG. 13 is a schematic view of some elements of the optical element driving mechanism 5100. The movable portion 5300 may include an accommodating portion 5303, and the driving assembly D5 is at least partially disposed in the accommodating portion 5303. For example, the first magnetic element 5410 may be disposed at the accommodating portion 5303 to fix the position of the first magnetic element 5410. In some embodiments, the movable portion 5300 may have two accommodating portions 5303 for accommodating the first magnetic elements 5410 for moving the movable portion 5300 in different directions. In some embodiments, the second magnetic element 5420 may be disposed in the accommodating portion 5303, depending on design requirements.

As shown in FIG. 13, the movable portion 5300 may include two arm portions 5301 extending away from the main axis O5, and the contact elements 5302 may be disposed on the arm portions 5301. Furthermore, the two arm portions 5301 and the two contact portions 5302 may be disposed on opposite sides of the main axis O5, such as on a diagonal of the movable portion 5300, and they may extend to the connecting element 5330 in FIG. 2 (–Z direction). In some embodiments, the connecting element 5330 includes four extending portions 5334 and four connecting portions 5336 disposed on the extending portions 5334, two of the connecting portions 5336 may be connected to the movable portion 5300, and the other two connecting portions 5336 may be connected to the strengthening element 5220 (a portion of the fixed portion F5). Furthermore, the connecting portions 5336 that are connected to the movable portion 5300 may be positioned on opposite sides of the main axis to allow the movable portion 5300 to move relative to the fixed portion F5 in different directions.

Furthermore, in some embodiments, the movable portion 5300 may include metal, so the movable portion 5300 may be a magnetic permeable element for guiding the magnetic lines of force of the first magnetic element 5410 or the second magnetic element 5420, so the magnetic field of the first magnetic element 5410 or the second magnetic element 5420 may be concentrated, and the magnetic force generated from the first magnetic element 5410 or the second magnetic element 5420 may be increased. Moreover, the mechanical strength of the movable portion 5300 which includes metal material may be further increased. In some embodiments, the metal contact elements 5302 may be disposed on the movable portion 5300 for connecting to the connecting element 5330 (described later), such as by soldering, welding, resistance welding, or conductive adhesive. In some embodiments, the movable portion 5300 and the contact element 5302 may be formed as one piece.

It should be noted that the first magnetic element 5410 may be positioned at a side of the second magnetic element 5420, and a magnetic permeable element 5830 may be positioned at another side of the second magnetic element 5420, as shown in FIG. 13. The material of the magnetic permeable element 5830 may include metal, and the magnetic permeable element 5830 may be used for guiding the magnetic lines of force of the first magnetic element 5410 or the second magnetic element 5420, so the magnetic field of the first magnetic element 5410 or the second magnetic element 5420 may be concentrated, and the magnetic force generated from the first magnetic element 5410 or the second magnetic element 5420 may be increased. The distance between the first magnetic element 5410 and the optical element 5990 may be less than the distance between the magnetic permeable element 5830 and the optical element 5990, and the magnetic permeable element 5830 and the second magnetic element 5420 may at least partially overlap each other in a direction that is perpendicular to the main axis O5. As a result, the size of the optical element driving mechanism O5 may be reduced to achieve miniaturization.

Figure 14:
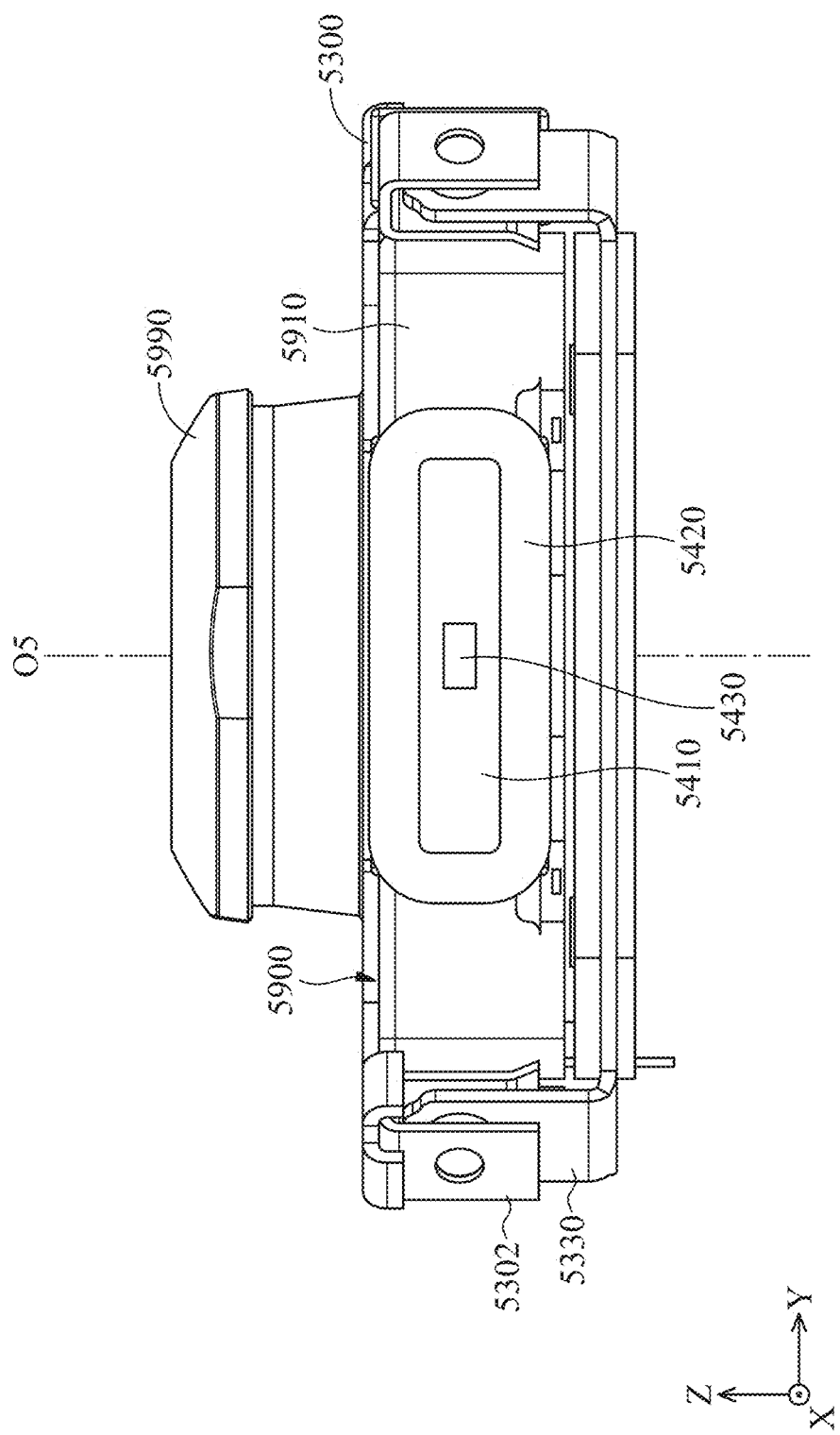
FIG. 14 is a side view of some elements of the optical element driving mechanism.

FIG. 14 is a side view of some elements of the optical element driving mechanism 5100. As shown in FIG. 14, the driving assembly D5 (includes the magnetic element 5410 and the second magnetic element 5420) and the optical module 5900 may be connected by the movable portion 5300. Furthermore, the movable portion 5300 and the optical module 5900 may at least partially overlap each other in a direction that is perpendicular to the main axis O5, such as along X axis or Y axis. As a result, required space may be reduced to achieve miniaturization.

Figure 16:
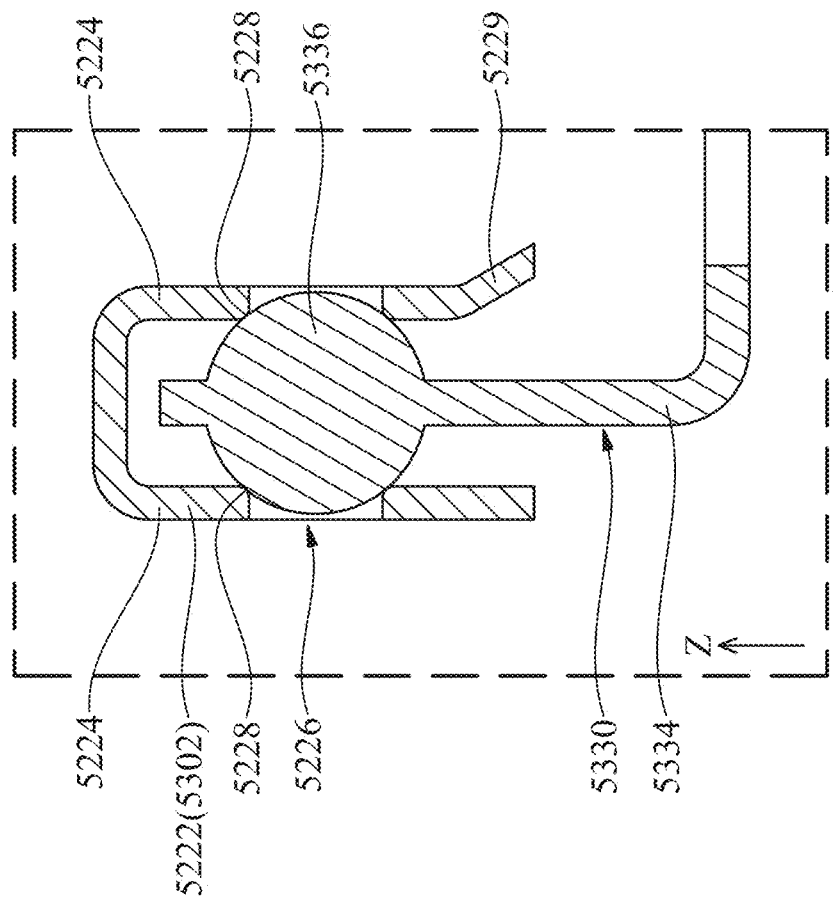
FIG. 16 is a cross-sectional view of a portion where the connecting portion and the contact element are connected with each other.
Figure 15:
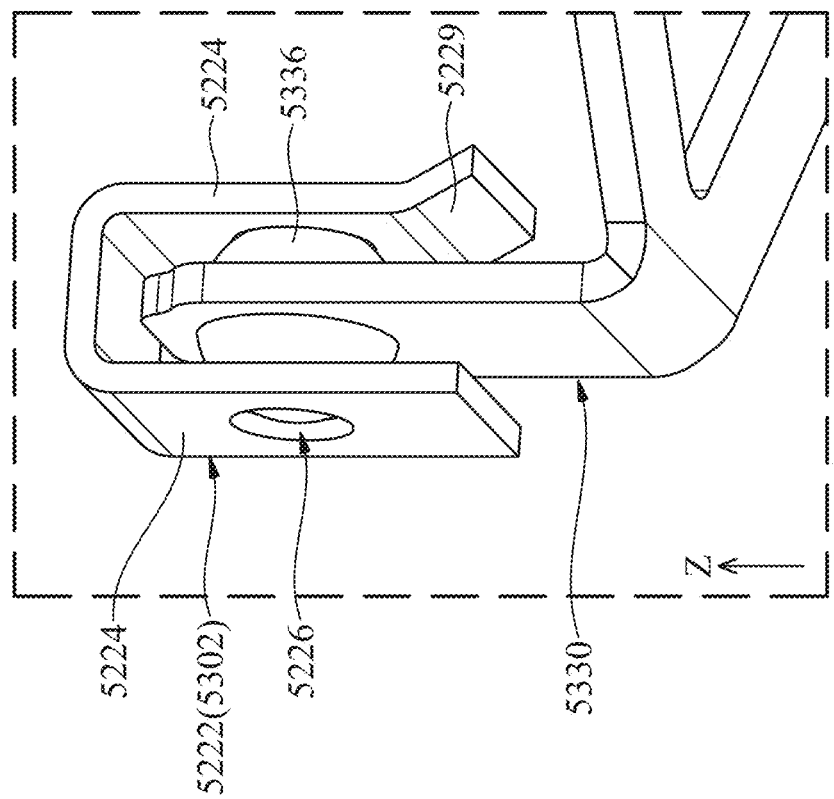
FIG. 15 is an enlarged view of a portion where the connecting portion and the contact element are connected with each other.

The connecting portions 5336 of the connecting element 5330 may be connected to the contact element 5302 and the contact element 5222. For example, FIG. 15 is an enlarged view of a portion where the connecting portion 5336 and the contact element 5302 (or the contact element 5222) are connected with each other, and FIG. 16 is a cross-sectional view of a portion where the connecting portion 5336 and the contact element 5302 (or the contact element 5222) are connected with each other. A pair of contact portions 5224 may be formed on the contact element 5222 or the contact element 5302 and may extend in Z axis. Each of the two contact portions 5224 may have an assemble portion 5226, such as a circular opening. The connecting portion 5336 may be held by the two contact portions 5224 from opposite sides of the connecting portion 5336. In other words, the connecting portion 5336 may be positioned between the two contact portions 5224. Furthermore, the spherical connecting portion 5336 may be partially disposed in the assembly portion 5226. That is, the connecting portion 5336 may overlap the contact portion 5224 when viewed along the main axis O5 (Z axis), so the connecting element 5330 may be movably connected to the case 5200 (a portion of the fixed portion F5) or the movable portion 5300. In other words, one of the pair of the connecting portions 5336 of the contact elements 5222 or 5302 are directly and movably connected to one of the movable portion 5300 or the fixed portion F5, and another pair of the connecting portions 5336 are directly and movably connected to another one of the movable portion 5300 or the fixed portion F5.

In some embodiments, the corner 5228 of the assemble portion 5226 that in contact with the connecting portion 5336 may be a non-normal angle, such as a radius angle or a chamfer angle, to prevent the connecting portion 5336 from directly contacting to a normal angle, which may damage the connecting portion 5336. Furthermore, a bending portion 5229 may be positioned at the end of the contact portion 5224, and the bending portion 5229 is bent to a direction that is away from another one of the contact portions 5224, so the connecting portion 5336 may be easily disposed between the two contact portions 5224.

As a result, the connecting element 5330 may be disposed in the optical element driving mechanism 5100 by friction contact to achieve rotation relative to a single axis or multiple axes, rather than being suspended in the optical element driving mechanism 5100 by springs. As a result, the optical element driving mechanism 5100 may be operated after overcoming the maximum static friction between the connecting elements 5330, the case 5200, and the movable portion 5330, and required electricity for operation may be reduced. Furthermore, this design allows the optical module 5900 may rotate relative to the optical element driving mechanism 5100 within a greater angle, such as ±2 to ±10 degrees. Moreover, this design has the connecting element 5330 having a higher mechanical strength, the reliability of the optical element driving mechanism 5100 may be increased, and the optical module 5900 may be prevented from sinking because of its own weight.

Figure 17:
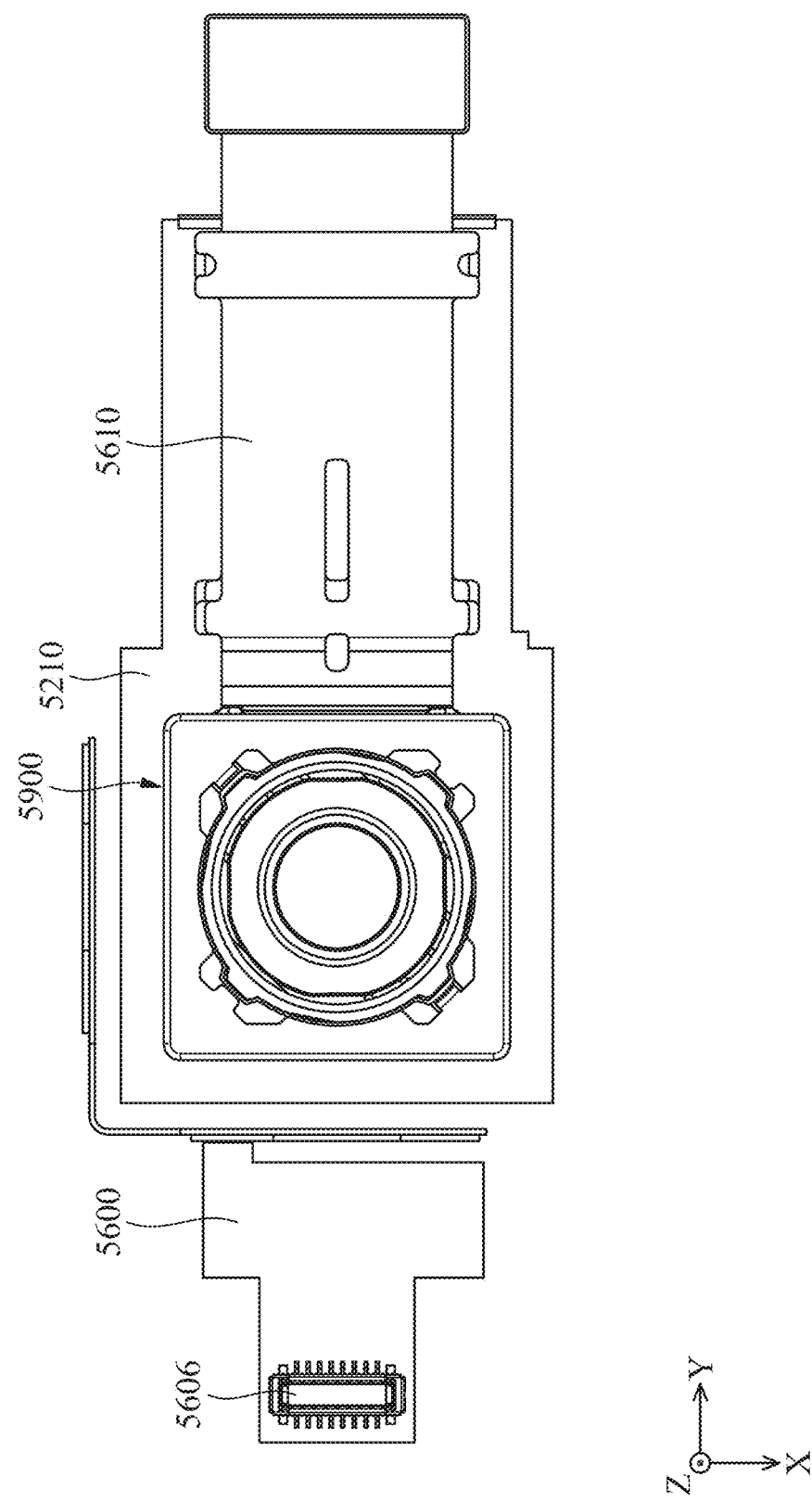
FIG. 17 is a top view of some elements of the optical element driving mechanism.

FIG. 17 is a top view of the base 5210, the first circuit board 5600, the second circuit board 5610, and the optical module 5900, wherein the first circuit board 5600 and the second circuit board 5610 may be electrically to different elements. As shown in FIG. 17, the first circuit board 5600 and the second circuit board 5610 may not overlap each other in the Z direction, or the first circuit board 5600 and the optical module 5900 may not overlap each other in the Z direction, so the size of the optical element driving mechanism 5100 in the Z direction may be reduced to achieve miniaturization. For example, in some embodiments, the first circuit board 5600 and the second circuit board 5610 may be overlap each other to reduce the side of the optical element driving mechanism 5100 in the X or Y axis. In some embodiments, as shown in FIG. 17, the first circuit board 5600 and the second circuit board 5610 may extend in directions that are parallel with each other, or the first circuit board 5600 and the second circuit board 5610 may extend in directions that are not parallel with each other, depending on design requirements.

In some embodiments, another optical element (not shown) may be provided outside the optical element driving mechanism 5100 to form a duel lenses optical system. In a direction that is parallel to the main axis O5, the other optical element does not overlap the first circuit board 5600 or the second circuit board 5610 to reduce the size of the optical system along the main axis O5.

Figure 19:
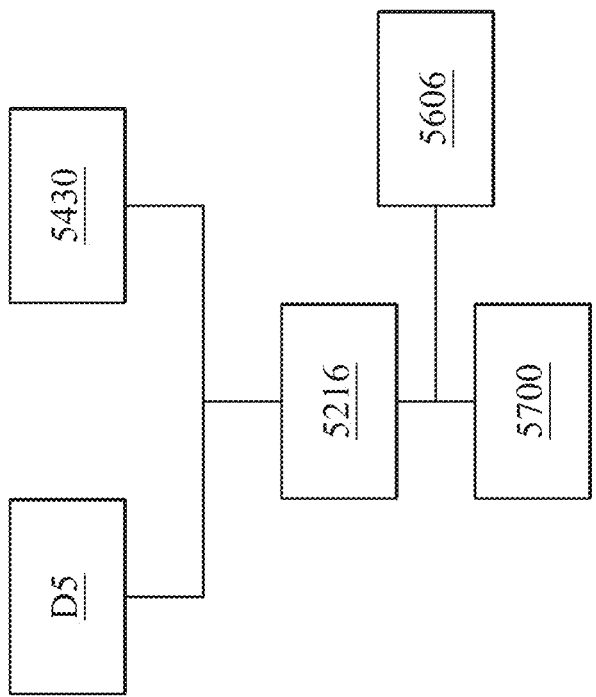
FIG. 18 and FIG. 19 are block diagrams showing the electrical connection relationship between some elements of the optical element driving mechanism.
Figure 18:
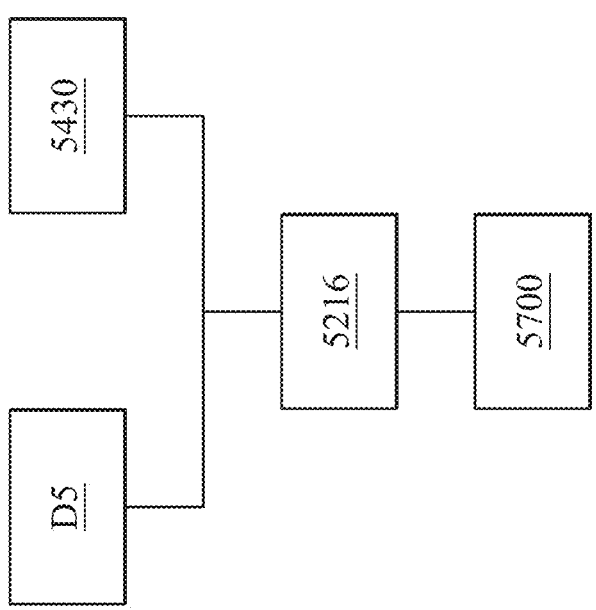

FIG. 18 and FIG. 19 are block diagrams showing the electrical connection relationship between some elements of the optical element driving mechanism 5100. The optical element driving mechanism 5100 may further includes an inertia sensor 5700 (or may be disposed outside the optical element driving mechanism 5100) electrically connected to the control element 5216. The inertia sensor 5700 may include a gyroscope or an acceleration sensor and may be electrically connected to the driving assembly D5 to measure the inertial of the optical element driving mechanism 5100. After the state of gravity or acceleration of the optical element driving mechanism 5100 is measured by the inertia sensor 5700, the result may be sent to the control element 5216, and appropriate signal may be provided by the control element 5216 to the driving assembly D5 to drive the optical module 5900 for rotating. Furthermore, the control element 5216 may be electrically connected to the position sensor 5430 to control the driving assembly D5 by the signal provided by the inertia sensor 5700 and the position sensor 5430.

In some embodiments, as shown in FIG. 19, a reading element 5606 electrically connected to the inertia sensor 5700 and the control element 5216 may be provided to receive the signal provided by the inertia sensor 5700, and the control element 5216 may receive the signal provided by the position sensor 5430 to prevent interference between different signals. In some embodiments, the reading element 5606, the control element 5216 and/or the position sensor 5430 may be packaged as one piece to reduce required number of elements. In some embodiments, the position of the reading element 5606 and the control element 5216 may be interchanged.

In summary, an optical element driving mechanism is provided. The optical element driving mechanism includes a movable portion, a fixed portion, a driving assembly, and a stopping assembly. The movable portion is used for connecting to an optical element having a main axis. The movable portion is movable relative to the fixed portion. The driving assembly is disposed on the fixed portion or the movable portion to move the movable portion relative to the fixed portion. The stopping assembly connects to the movable portion and the fixed portion to limit the range of motion of the movable portion relative to the fixed portion. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
  a fixed portion;
  a movable portion movably connected to the fixed portion, wherein the movable portion is used for connecting to an optical element having a main axis; and
  a driving assembly disposed on the fixed portion or the movable portion, and the driving assembly is used for driving the movable portion to move relative to the fixed portion, wherein the driving assembly comprises:
    two first magnetic elements disposed on the movable portion; and
    two second magnetic elements disposed on the fixed portion and corresponding to the first magnetic elements,
  wherein the fixed portion comprises a case comprising a main body and a stopping portion, the stopping portion extends from the main body to the movable portion, and the stopping portion has a shape that is symmetrical relative to the main axis.

2. The optical element driving mechanism as claimed in claim 1, wherein the material of the stopping portion comprises soft material, and the stopping portion is separated from the main body.

3. The optical element driving mechanism as claimed in claim 1, wherein the material of the stopping portion comprises metal, and the stopping portion and the main body are formed as one piece.

4. The optical element driving mechanism as claimed in claim 1, wherein the stopping portion has a circular shape.

5. The optical element driving mechanism as claimed in claim 1, wherein the material of the movable portion comprises metal.

6. The optical element driving mechanism as claimed in claim 1, wherein the movable portion comprises:
  an arm portion extending away from the main axis; and
  a contact element disposed on the arm portion.

7. The optical element driving mechanism as claimed in claim 6, wherein the arm portion and the contact element are formed as one piece.

8. The optical element driving mechanism as claimed in claim 6, wherein the arm portion and the contact element are formed separately.

9. The optical element driving mechanism as claimed in claim 6, wherein the arm portion comprises a surface, a normal direction of the surface is parallel to the main axis, and the contact element is in direct contact with the surface.

10. The optical element driving mechanism as claimed in claim 1, further comprising a first circuit board disposed on the fixed portion, wherein the first circuit board does not overlap the optical element when viewed along the main axis.

11. The optical element driving mechanism as claimed in claim 10, further comprising a second circuit board disposed on the fixed portion, wherein the first circuit board does not overlap the second circuit board when viewed along the main axis.

12. The optical element driving mechanism as claimed in claim 11, further comprising another optical element that does not overlap the first circuit board or the second circuit board in a direction that is parallel to the main axis.

13. The optical element driving mechanism as claimed in claim 10, wherein the first circuit board overlaps the movable portion in a direction that is perpendicular to the main axis.

14. The optical element driving mechanism as claimed in claim 1, wherein the driving assembly and the optical element are disposed on the movable portion, and the driving assembly, the optical element, and the movable portion overlap each other in a direction that is perpendicular to the main axis.

15. The optical element driving mechanism as claimed in claim 1, further comprising an optical module, wherein the optical module comprises a driving component, the driving assembly and the driving component are disposed on opposite sides of the main axis, and the optical element is disposed in the optical module.

16. The optical element driving mechanism as claimed in claim 1, further comprising a connecting element, wherein the connecting element comprises four extending portions and four connecting portions disposed on the extending portions, two of the connecting portions are connected to the movable portion, and the other two connecting portions are connected to the fixed portion.

17. The optical element driving mechanism as claimed in claim 16, wherein the connecting portions connected to the movable portion are disposed on opposite sides of the main axis, and the connecting portions connected to the fixed portion are disposed on opposite sides of the main axis.

18. The optical element driving mechanism as claimed in claim 1, wherein the movable portion comprises an accommodating portion, and the driving assembly is at least partially disposed in the accommodating portion.

* * * * *